United States Patent
Hull et al.

(10) Patent No.: US 11,835,930 B2
(45) Date of Patent: Dec. 5, 2023

(54) SYSTEMS AND METHODS FOR MODELING AND CONTROLLING BUILDING EQUIPMENT

(71) Applicant: Johnson Controls Tyco IP Holdings LLP, Milwaukee, WI (US)

(72) Inventors: Nicholas I. Hull, Etters, PA (US); Christopher A. Hunt, Dover, PA (US); Vaughn H. Hughes, Sandpoint, ID (US); Christopher R. Felpel, York, PA (US); Shailendra K. Verma, Mechanicsburg, PA (US); Stephen J. Gentile, III, Stewartstown, PA (US); Dale S. Smith, Parkville, MD (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 145 days.

(21) Appl. No.: 17/477,297

(22) Filed: Sep. 16, 2021

(65) Prior Publication Data

US 2023/0077866 A1 Mar. 16, 2023

(51) Int. Cl.
*G05B 13/04* (2006.01)

(52) U.S. Cl.
CPC ................. *G05B 13/048* (2013.01)

(58) Field of Classification Search
CPC .................................................. G05B 13/048
See application file for complete search history.

(56) References Cited

U.S. PATENT DOCUMENTS

| | | | |
|---|---|---|---|
| 2012/0166497 A1* | 6/2012 | Choi | G06Q 50/16 707/805 |
| 2013/0173062 A1* | 7/2013 | Koenig-Richardson | G06Q 10/0631 700/275 |
| 2013/0345880 A1* | 12/2013 | Asmus | G05D 23/1917 700/276 |
| 2015/0308708 A1* | 10/2015 | Harada | F24F 11/523 700/276 |

(Continued)

OTHER PUBLICATIONS

U.S. Appl. No. 17/388,514, filed Jul. 29, 2021, Johnson Controls Tyco IP Holdings LLP.

(Continued)

*Primary Examiner* — Kurt Philip Liethen
(74) *Attorney, Agent, or Firm* — Foley & Lardner LLP

(57) ABSTRACT

A system comprising one or more memory devices having instructions stored thereon that, when executed by one or more processors, cause the one or more processors to perform operations comprising receiving a request for a rating for a device of building equipment, the request for the rating including a plurality of attributes characterizing the device of building equipment including at least a first device characteristic, selecting, from a plurality of rating engines, a first rating engine for use in generating the rating based on the plurality of attributes characterizing the device of building equipment, communicating the first device characteristic to the first rating engine, receiving a first rating for the device of building equipment from the first rating engine, and using the first rating to at least one of generate a (Continued)

predictive model for the device of building equipment or control the device of building equipment.

20 Claims, 9 Drawing Sheets

(56) References Cited

U.S. PATENT DOCUMENTS

| | | | | |
|---|---|---|---|---|
| 2017/0102162 A1* | 4/2017 | Drees | ............. | H02J 3/003 |
| 2018/0299840 A1* | 10/2018 | Sinha | ............. | G05B 13/048 |
| 2018/0313557 A1* | 11/2018 | Turney | ............. | G05D 23/1904 |
| 2018/0364654 A1* | 12/2018 | Locke | ............. | G05B 15/02 |
| 2018/0372363 A1* | 12/2018 | Park | ............. | F24F 11/63 |
| 2023/0077866 A1* | 3/2023 | Hull | ............. | G05B 15/02 |
| | | | | 700/275 |

OTHER PUBLICATIONS

U.S. Appl. No. 17/464,557, filed Sep. 1, 2021, Johnson Controls Tyco IP Holdings LLP.

* cited by examiner

SYSTEMS AND METHODS FOR MODELING AND CONTROLLING BUILDING EQUIPMENT

BACKGROUND

The present disclosure relates generally to a web services system, and more particularly to a web services system configured to provide device ratings that may be used to generate a predictive model.

A chiller is an apparatus that is used to generate temperature controlled water, most often cooled water, which can be used to cool air, products, machines, etc. Chillers have become increasingly complex over time due to, for example, advances in different types of chillers (e.g., air chillers, water chillers, centrifugal chillers, etc.), technological improvements to component parts (e.g., compressors, drive lines, motors, etc.), changes in chiller sizes, etc. Thus, it has become increasingly difficult to determine the components and/or properties of a chiller that best suit customers' needs. For example, different chillers (and/or components) may better suit a customers' needs based on the desired chiller location, chiller type, power consumption, etc. It would be beneficial to have a system and/or method for quickly providing chiller ratings based on a customer's desired characteristics of a chiller.

SUMMARY

One implementation of the present disclosure is system for modeling and controlling building equipment, the system comprising one or more memory devices having instructions stored thereon that, when executed by one or more processors, cause the one or more processors to perform operations comprising obtaining a device profile for a device of building equipment, the device profile including a plurality of attributes characterizing the device of building equipment including at least a first device characteristic, selecting, from a plurality of rating engines, a first rating engine for use in generating the rating based on the plurality of attributes characterizing the device of building equipment, communicating the first device characteristic to the first rating engine, receiving a first rating for the device of building equipment from the first rating engine, and using the first rating to at least one of generate a predictive model for the device of building equipment or control the device of building equipment.

In some embodiments, the operations further comprise obtaining the device profile for the device of building equipment, the device profile including a second device characteristic, selecting, from the plurality of rating engines, a second rating engine for use in generating a second rating based on the plurality of attributes characterizing the device of building equipment, communicating the second device characteristic to the second rating engine, receiving the second rating for the device of building equipment from the second rating engine, and using the second rating to at least one of generate the predictive model for the device of building equipment or control the device of building equipment.

In some embodiments, communicating the first device characteristic to the first rating engine and the second device characteristic to the second rating engine occurs asynchronously, and wherein the first rating engine and the second rating engine are different rating engines.

In some embodiments, communicating the first device characteristic to the first rating engine and the second device characteristic to the second rating engine occurs in series, and wherein the first rating engine and the second rating engine are the same rating engine.

In some embodiments, the operations further comprise communicating the first rating to a device ratings database, wherein the device ratings database is configured to store a plurality of ratings.

In some embodiments, the operations further comprise communicating the plurality of attributes characterizing the device of building equipment and the first device characteristic to a database, wherein the database is configured to store the plurality of attributes characterizing the device of building equipment and a plurality of device characteristics.

In some embodiments, the device profile includes a third device characteristic, and wherein the operations further comprise determining the third device characteristic is stored in a database, and receiving, from the database, a third device rating based on the third device characteristic.

In some embodiments, the plurality of attributes characterizing the device of building equipment comprises at least one of a device family type, a device location, or a device configuration.

In some embodiments, the first rating comprises at least one of a device power consumption, a device performance metric, or a device flow metric.

In some embodiments, the operations further comprise providing the first rating to a user via a user interface.

Another implementation of the present disclosure is a method for modeling and controlling building equipment, the method comprising obtaining a device profile for a device of building equipment, the device profile including a plurality of attributes characterizing the device of building equipment including at least a first device characteristic, selecting, from a plurality of rating engines, a first rating engine for use in generating the rating based on the plurality of attributes characterizing the device of building equipment, communicating the first device characteristic to the first rating engine, receiving a first rating for the device of building equipment from the first rating engine, and using the first rating to at least one of generate a predictive model for the device of building equipment or control the device of building equipment.

In some embodiments, the method further comprises obtaining the device profile for the device of building equipment, the device profile including a second device characteristic, selecting, from the plurality of rating engines, a second rating engine for use in generating a second rating based on the plurality of attributes characterizing the device of building equipment, communicating the second device characteristic to the second rating engine, receiving the second rating for the device of building equipment from the second rating engine, and using the second rating to at least one of generate the predictive model for the device of building equipment or control the device of building equipment.

In some embodiments, the method further comprises communicating the first device characteristic to the first rating engine and the second device characteristic to the second rating engine asynchronously, wherein the first rating engine and the second rating engine are different rating engines.

In some embodiments, the method further comprises communicating the first device characteristic to the first rating engine and the second device characteristic to the second rating engine occurs in series, wherein the first rating engine and the second rating engine are the same rating engine.

In some embodiments, the method further comprises communicating the first rating to a device ratings database, wherein the device ratings database is configured to store a plurality of ratings.

In some embodiments, the method further comprises communicating the plurality of attributes characterizing the device of building equipment and the first device characteristic to a database, wherein the database is configured to store the plurality of attributes characterizing the device of building equipment and a plurality of device characteristics.

In some embodiments, the method further comprises determining a third device characteristic is stored in a database, and receiving, from the database, a third device rating based on the third device characteristic, wherein the device profile includes the third device characteristic.

In some embodiments, the method further comprises providing the first rating to a user via a user interface.

Yet another implementation of the present disclosure is a non-transitory computer readable medium comprising instructions stored thereon that, when executed by one or more processors, cause the one or more processors to obtain a device profile for a device of building equipment, the device profile including a plurality of attributes characterizing the device of building equipment including at least a first device characteristic, select, from a plurality of rating engines, a first rating engine for use in generating the rating based on the plurality of attributes characterizing the device of building equipment, communicate the first device characteristic to the first rating engine, receive a first rating for the device of building equipment from the first rating engine, and use the first rating to at least one of generate a predictive model for the device of building equipment or control the device of building equipment.

In some embodiments, the instructions further cause the one or more processors to obtain the device profile for the device of building equipment, the device profile including a second device characteristic, select, from the plurality of rating engines, a second rating engine for use in generating a second rating based on the plurality of attributes characterizing the device of building equipment, communicate the second device characteristic to the second rating engine, receive the second rating for the device of building equipment from the second rating engine, and use the second rating to at least one of generate the predictive model for the device of building equipment or control the device of building equipment.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, systems and methods for modeling and controlling building equipment are shown, according to various embodiments. A ratings platform is a component of a web services system that provides device rating data, which can be used to generate a predictive model for a building equipment device and/or control the device. The ratings platform may receive desired device input data (e.g., a device profile as part of a device rating request, a device rating request, etc.) from various sources (e.g., a user device, a network, a storage system, etc.), determine a device rating based on the rating request (e.g., the device profile), and provide the device rating to a user. In some cases, the ratings platform may receive a device rating request that includes a plurality of input data (e.g., device attributes, characteristics, configurations, etc.), and determine a plurality of ratings based on the input data. In some cases, the ratings platform may be configured to receive a rating request (e.g., having a plurality of input data), and determine the plurality of device ratings asynchronously. In other cases, the ratings platform may receive a rating request (e.g., having a plurality of input data), and determine a rating by determining sub-ratings in series. In yet other cases, the ratings platform may receive a ratings request (e.g., having a plurality of input data), and determine the device rating based on a set of stored device datasets and/or data subsets. In this regard, the ratings platform described herein is configured to provide a larger number of device ratings at a more rapid speed, so as to optimize a user's time. In some cases, the ratings platform may be configured to receive a rating request (e.g., having a plurality of input data), determine a device rating, and control the device and/or other equipment around a building or a building area.

Building HVAC Systems and Building Management Systems

Figure 1:
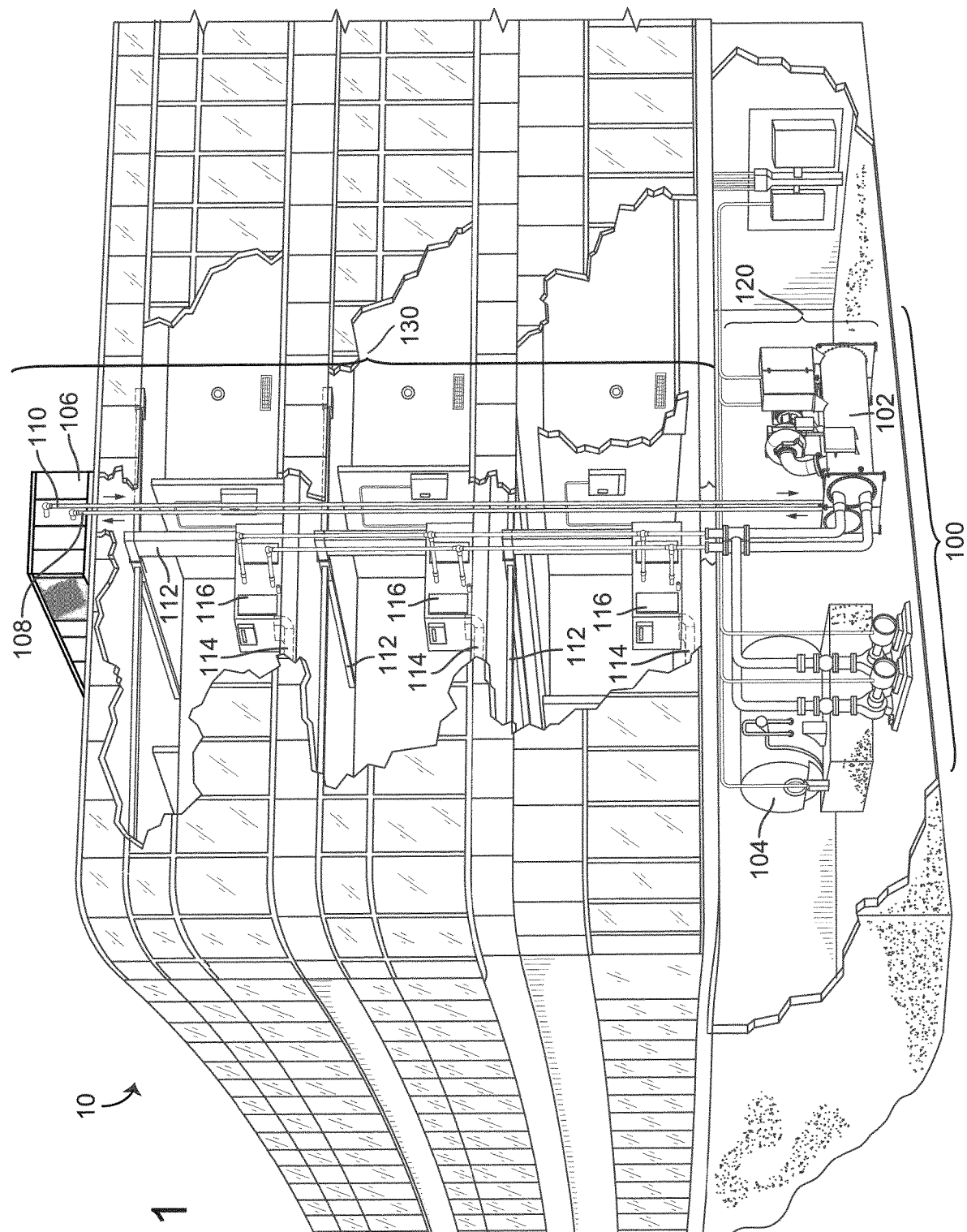
FIG. 1 is a drawing of a building equipped with a building management system (BMS) and a HVAC system, according to some embodiments.
Figure 2:
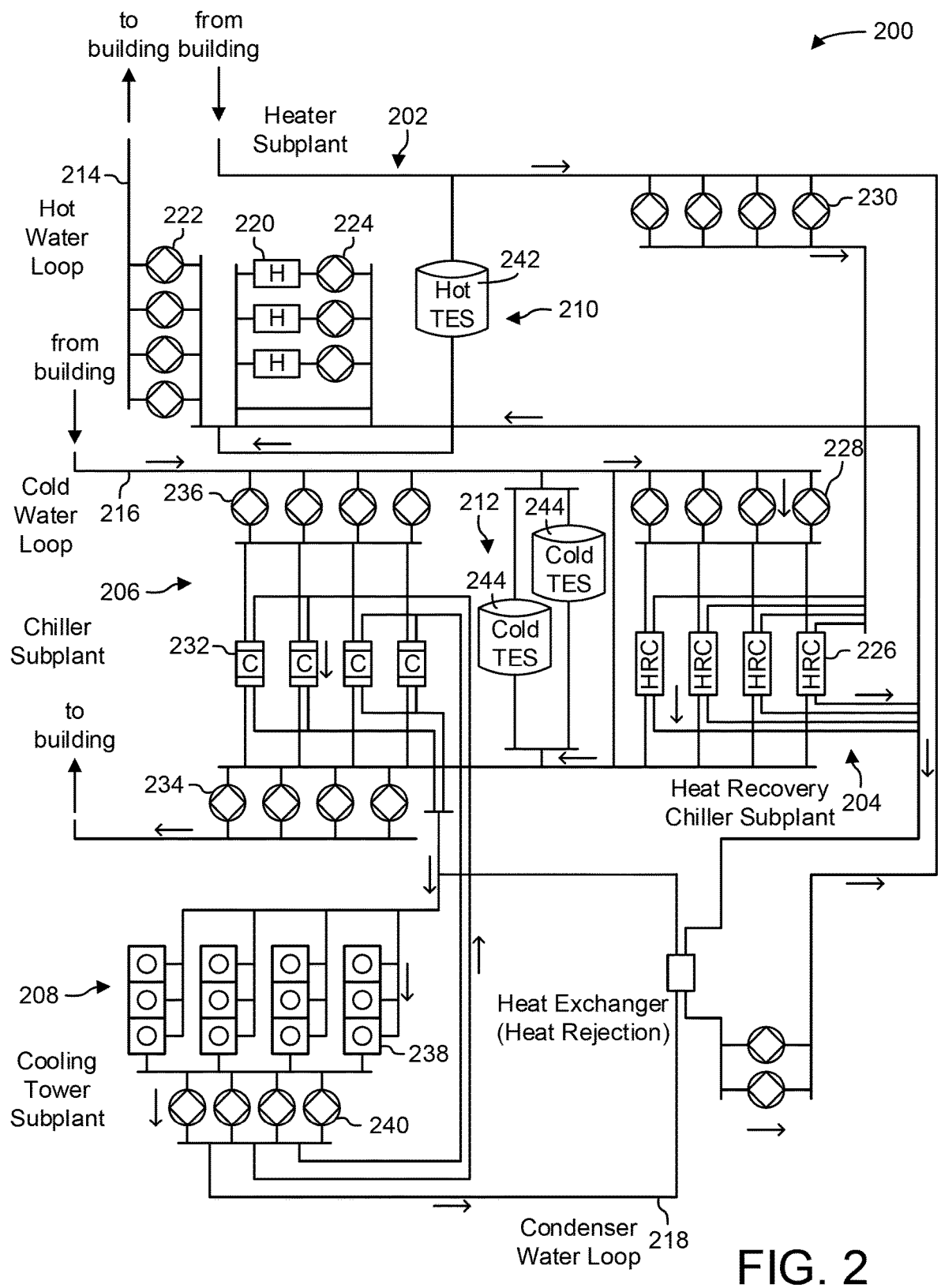
FIG. 2 is a schematic of a waterside system which can be used as part of the HVAC system of FIG. 1, according to some embodiments.
Figure 3:
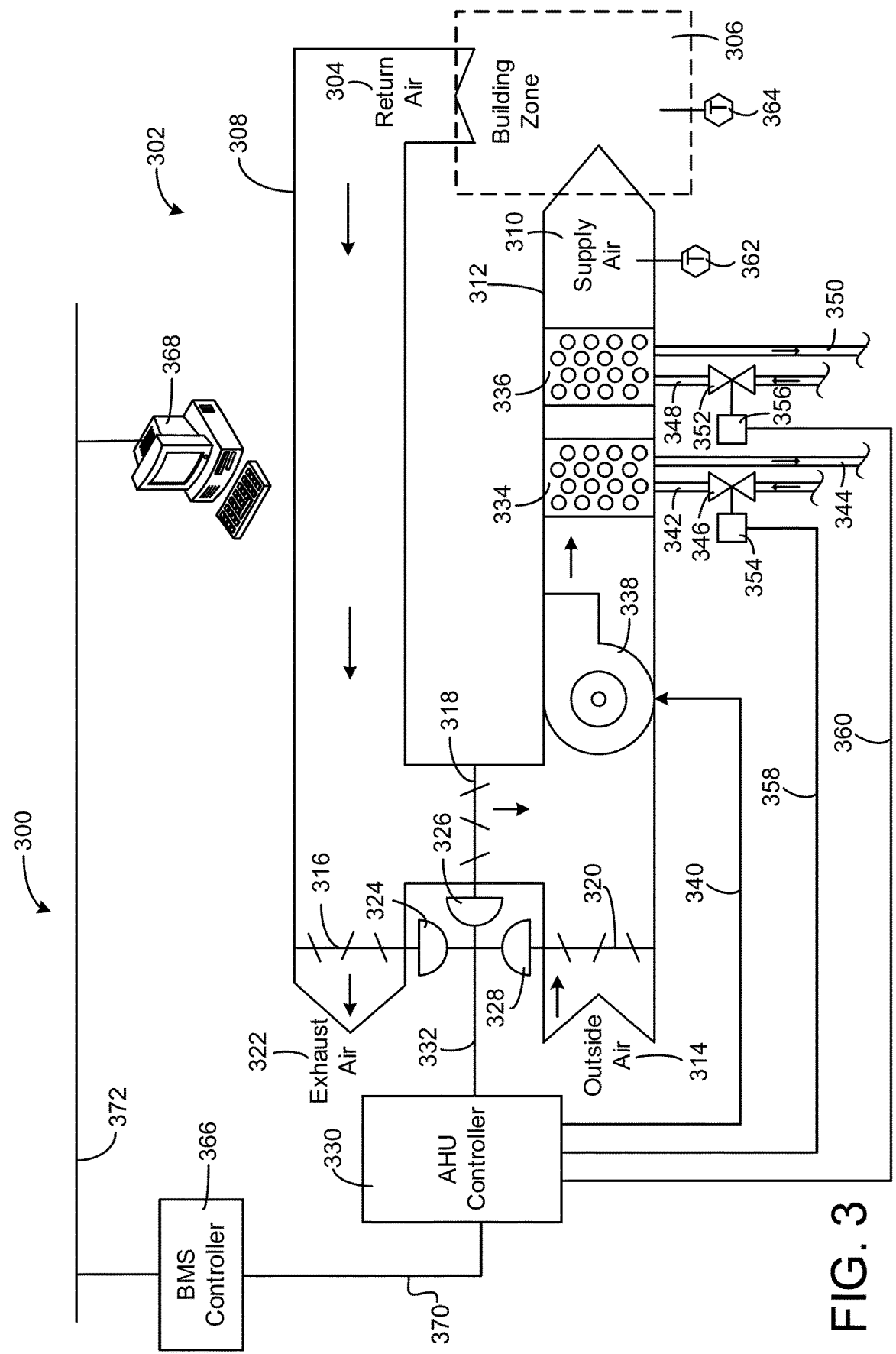
FIG. 3 is a block diagram of an airside system which can be used as part of the HVAC system of FIG. 1, according to some embodiments.
Figure 4:
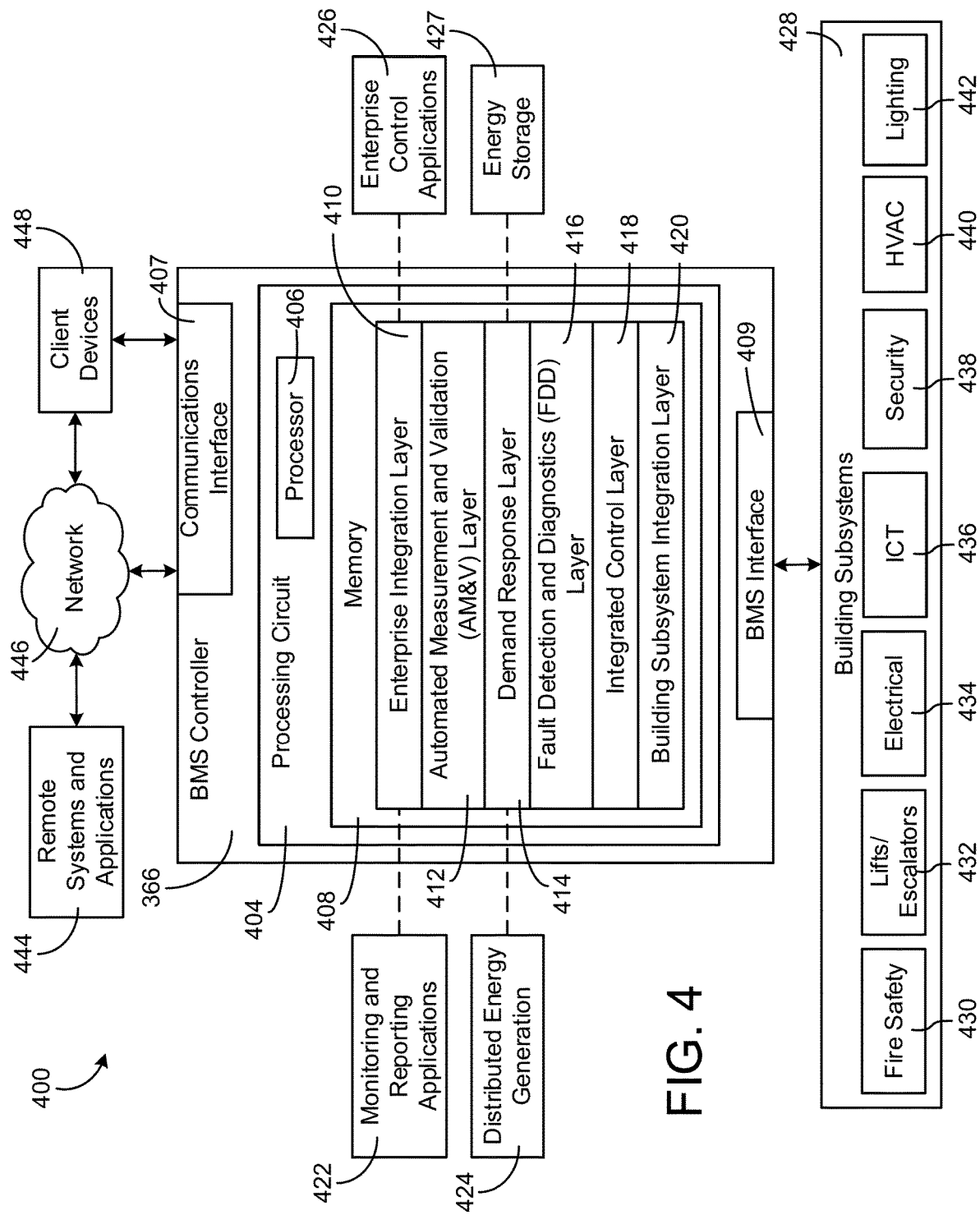
FIG. 4 is a block diagram of a BMS which can be used in the building of FIG. 1, according to some embodiments.
Figure 5:
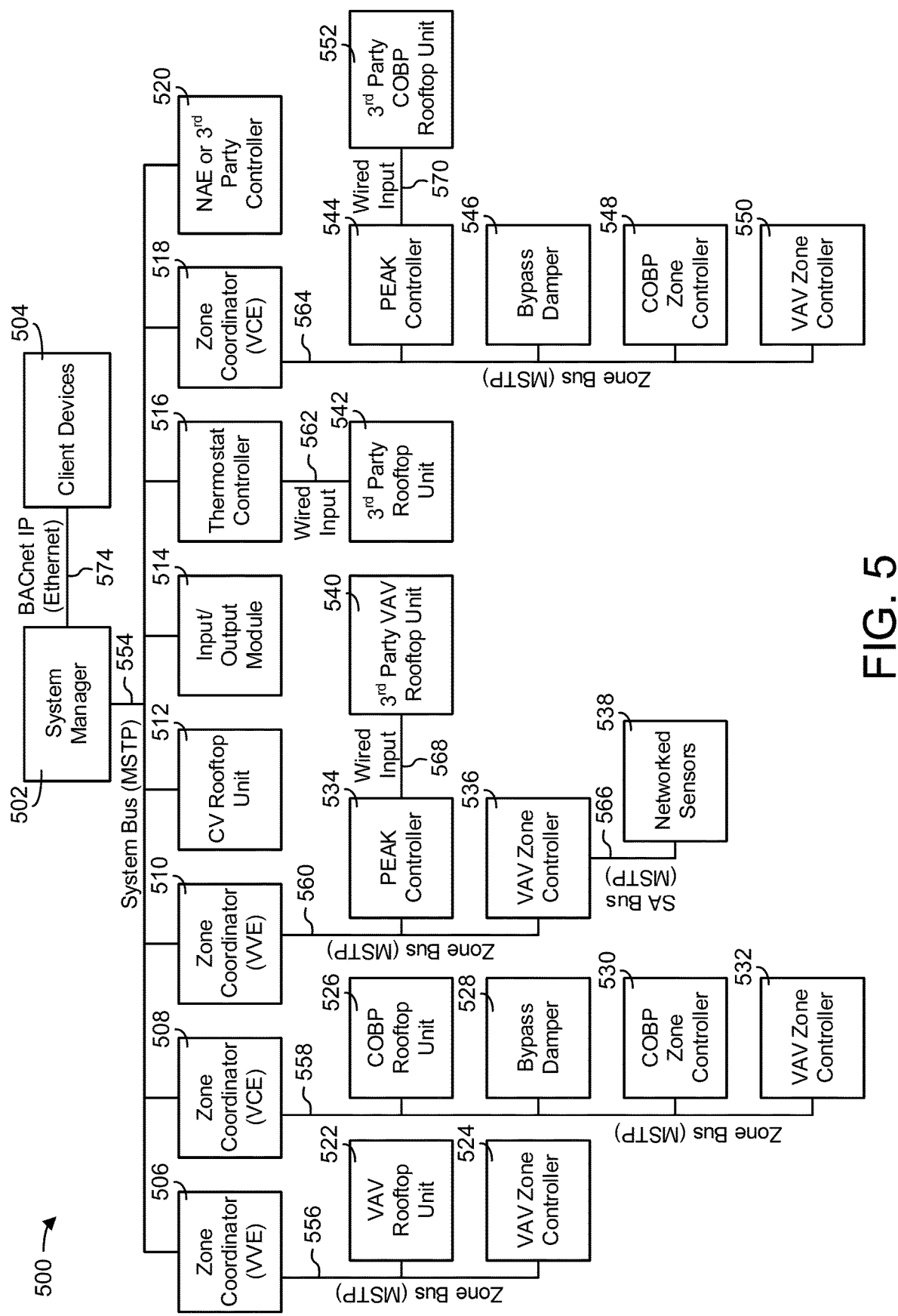
FIG. 5 is another block diagram of a BMS which can be used in the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360.

Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Web Services System with Ratings Platform

Figure 6:
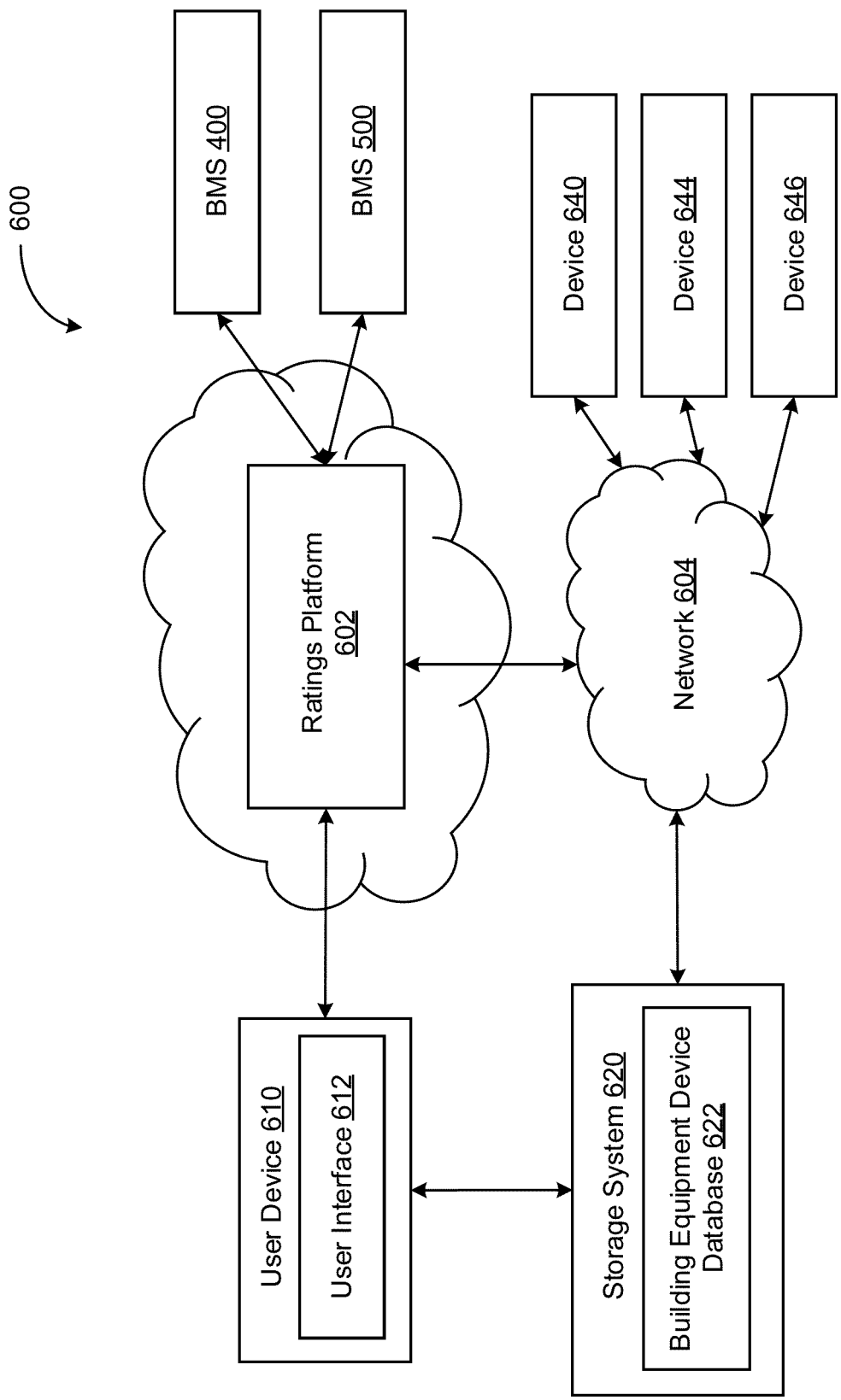
FIG. 6 is a block diagram of a web services system, according to some embodiments.

Referring now to FIG. 6, a block diagram of a web services system 600 is shown, according to an exemplary embodiment. Web services system 600 is shown to include ratings platform 602. The ratings platform 602 can be configured to obtain data from a variety of data sources, determine a device rating, and/or provide the device rating to a user device to be used for sales and/or marketing purposes. In some embodiments, the ratings platform 602 is also configured to obtain data from a variety of data sources, determine a device rating, and/or store the device rating to be used for subsequent ratings and/or for additional sales and/or marketing purposes.

In other embodiments, the ratings platform 602 is configured to obtain data from a variety of data sources, determine a device rating, generate a predictive model for a device (e.g., based on the device rating), and/or control the device or other equipment around a building or a building area (e.g., based on the device rating), or any combination thereof.

According to an exemplary embodiment, the ratings platform 602 obtains data from a variety of sources. For example, the ratings platform 602 is shown collecting data from a user device 610. The user device 610 can include one or more human-machine interfaces or client interfaces (e.g., shown as user interface 612, graphical user interfaces, reporting interfaces, text-based computer interfaces, client-facing web services, web servers that provide pages to web clients, etc.) for controlling, viewing, or otherwise interacting with the ratings platform 602. The user device 610 can be a computer workstation, a client terminal, a remote or local interface, or any other type of user interface device. The user device 610 can be a stationary terminal or a mobile device. For example, the user device 610 can be a desktop computer, a computer server with a user interface, a laptop computer, a tablet, a smartphone, a PDA, or any other type of mobile or non-mobile device.

The ratings platform 602 can also collect data from a storage system 620 (e.g., having a building equipment device database 622, etc.), either directly (e.g., via a network 604) or indirectly (e.g., via the user device 610). The storage system 620 may include one or more devices (e.g., RAM, ROM, Flash memory, hard disk storage, etc.) for storing data and/or computer code for completing or facilitating the various processes, layers and modules described in the present application. The storage system 620 can be or include volatile memory or non-volatile memory, and can include database components, object code components, script components, or any other type of information structure for supporting the various activities and information structures described in the present application.

In some embodiments, the ratings platform 602 also collects data from a building management system (e.g., BMS 400 of FIG. 4, BMS 500 of FIG. 5, etc.), and/or a variety of devices 640-644 (e.g., via the network 604), which may be internet of things (IoT) devices. While the devices described herein are generally referred to as IoT devices, it should be understood that, in various embodiments, the devices referenced in the present disclosure could be any type of devices capable to communication of data over an electronic network.

The ratings platform 602 may also be configured to generate data internally. For example, the ratings platform 602 may include a device batch orchestrator, a device rating service, a device rating cache database, a device rating storage, a plurality of rating engines, and/or other types of platform systems or services that receive, generate, store, etc. data. The data generated by ratings platform 602 can be collected, stored, and processed along with the data received from other data sources. The ratings platform 602 can collect data directly from external systems or devices or via the network 604 (e.g., a WAN, the Internet, a cellular network, etc.). Several features of the ratings platform 602 are described in detail below.

Ratings Platform

Figure 7:
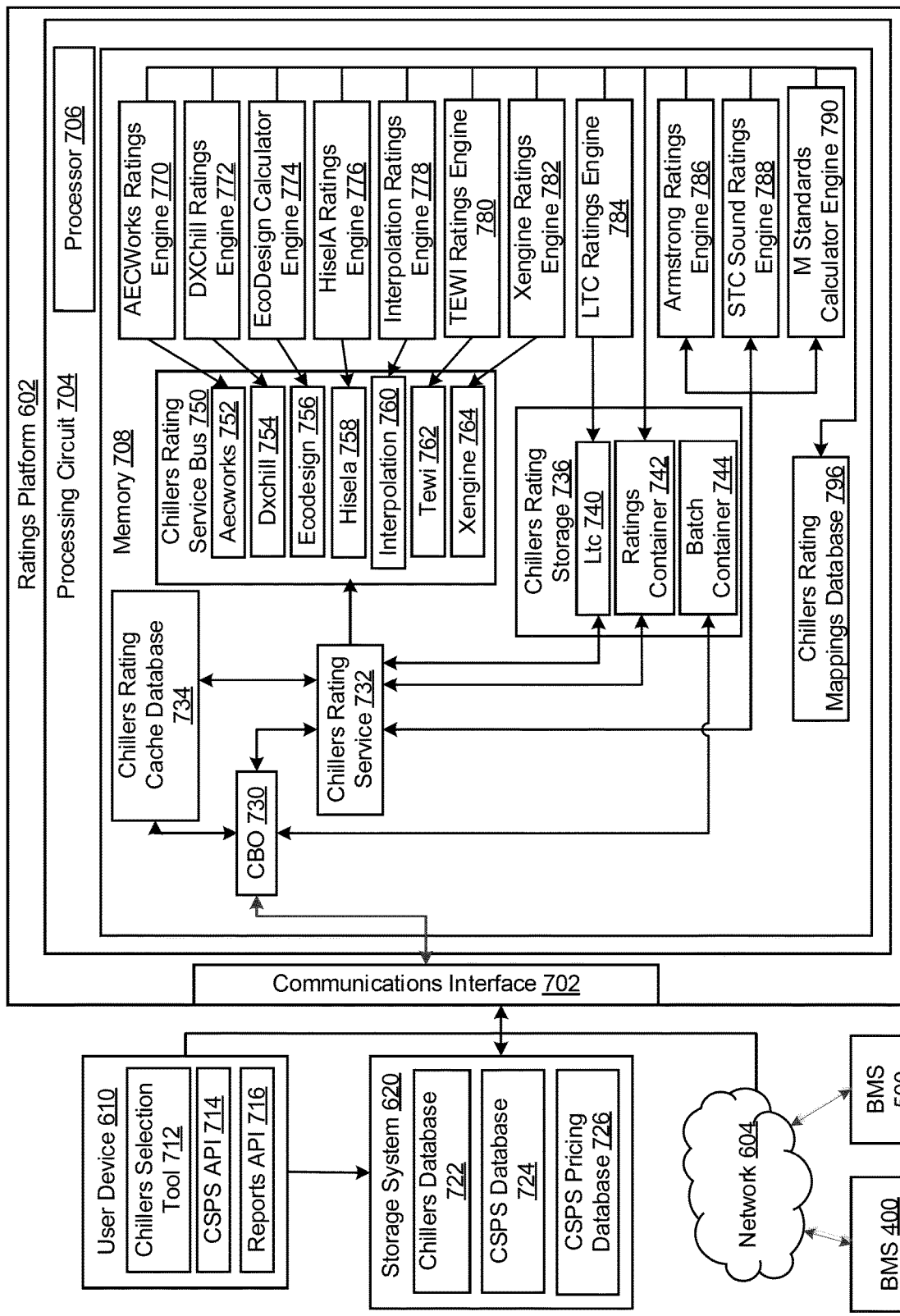
FIG. 7 is a block diagram of a ratings platform, according to some embodiments.

Referring now to FIG. 7, a block diagram illustrating the ratings platform 602 in greater detail is shown, according to some embodiments. The ratings platform 602 can be configured to obtain/receive/retrieve data from a variety of sources, determine a device rating for a building equipment device, provide the device rating to a user device to be used for sales and/or marketing purposes, and/or store the device rating to be used for subsequent ratings and/or for sales and/or marketing purposes. In an exemplary embodiment, the ratings platform 602 obtains/receives/retrieves a device profile for a device, determines a rating for the device, and provides the device rating to a user device to be used for sales and/or marketing purposes. In some embodiments, the ratings platform 602 receives a rating request for a device (e.g., a chiller), determines a rating for the device, and provides the device rating to a user device to be used for sales and/or marketing purposes. In other embodiments, the ratings platform 602 stores the device rating(s) for use in subsequent ratings and/or for sales and/or marketing purposes.

In other embodiments, the ratings platform 602 is also configured to obtain data from a variety of data sources, determine a device rating, generate a predictive model for the device, control the device, or any combination thereof. In an exemplary embodiment, the ratings platform 602 obtains/receives/retrieves a device profile for a device, determines a rating for the device, generates a predictive model for the device, and/or controls the device or other building devices. In some embodiments, the ratings platform 602 receives a rating request for a device (e.g., a chiller), determines a rating for the device, generates a predictive model for the device, and/or controls the device or other building devices. In some embodiments, the ratings platform 602 does not control the device, but rather provides the device rating and/or predictive model to a separate controller (e.g., any controller in BMS 400 or BMS 500) for use in controlling the device.

Although the ratings platform 602 is primarily described as generating chiller device ratings throughout the present disclosure, the systems and methods described herein are not limited to chillers. It is contemplated that the functions of the ratings platform 602 (e.g., the rating request, device rating, predictive model, controlling the device, etc.) may be readily applied to other types of devices without departing from the teachings of the present disclosure. For example, the device may be a component of an HVAC system (e.g., boilers, actuators, temperature sensors, and/or other devices that may be used for controlling temperature, humidity, airflow, or other variable conditions within a building), a component of a security system (e.g., occupancy sensors, video surveillance cameras, digital video recorders, video processing servers, intrusion detection devices, access control devices and servers, and/or other security-related devices), a component of a lighting system (e.g., light fixtures, ballasts, lighting sensors, dimmers, or other devices configured to controllably adjust the amount of light to a building, etc.), a component of a fire alerting system (e.g., fire detection devices, fire notification devices, fire suppression devices, etc.), or a component of any other system that is capable of managing building functions or devices, or any combination thereof.

Further, although the ratings platform 602 is described as being configured to generate a predictive model or control a device throughout the present disclosure, the systems and methods described herein are not limited to generating a predictive model and/or controlling a device. It is contemplated that the functions of the ratings platform 602 (e.g., the rating request, device rating, predictive model, etc.) may be readily applied in other applications without departing from the teachings of the present disclosure. For example, the ratings platform 602 may be configured to provide a device rating to a user device that includes a desirable device configuration for sales and/or marketing purposes (e.g., most cost efficient configuration, most energy efficient configuration, etc.). In some embodiments, the ratings platform 602 is configured to provide a device rating to a user device that includes suitable components of the device (e.g., for use in sales and/or marketing of components, etc.). In other embodiments, the ratings platform 602 is configured to provide a device rating that includes a degradation state of components of the device (e.g., for use in sales and/or marketing of components, etc.). In yet other embodiments, the ratings platform 602 is configured to provide a device rating that is used in combination with other devices (e.g., a user interactive tool, etc.), systems, and/or applications (e.g., for use in sales and/or marketing the device). An example of a system that can be used in combination with a device rating of the ratings platform 602 is described in U.S. patent application Ser. No. 17/464,557, titled "User-Interactive Tools and Methods for Configuring Building Equipment Systems" and filed Sep. 1, 2021, the entire disclosure of which is incorporated by reference herein.

As shown in FIG. 7, the ratings platform 602 collects data from a user device (shown as the user device 610 of FIG. 6), a storage system (shown as the storage system 620 of FIG. 6), and/or other systems or devices via a network (shown as the network 604 of FIG. 6). It should be noted that some or all of the components of the ratings platform 602 and/or the user device 610, the storage system 620, the network 604, etc., can be implemented as part of a cloud-based computing system configured to receive and process data from one or more external devices or sources (e.g., a user). Similarly, some or all of the components of the ratings platform 602 and/or the user device 610, the storage system 620, the network 604, etc., can be integrated within a single device or distributed across multiple separate systems or devices. In some embodiments, some or all of the components of the ratings platform 602 and/or the user device 610, the storage system 620, the network 604, etc. are components of a subsystem level controller, a plant controller, a device controller, a field controller, a computer workstation, a client device, or any other system or device that receives and processes data from IoT devices or other data sources.

The ratings platform 602 is shown to include a communications interface 702. The communications interface 702 can include wired or wireless communications interfaces (e.g., jacks, antennas, transmitters, receivers, transceivers, wire terminals, etc.) for conducting data communications between the ratings platform 602 and external systems or devices (e.g., the user device 610, the storage system 620, the network 604, the BMS 400, the BMS 500, etc.). Communications conducted via the communications interface 702 can be direct (e.g., local wired or wireless communications) or via the network 604 (e.g., a WAN, the Internet, a cellular network, etc.).

In some embodiments, the communications interface 702 facilitates communications between the ratings platform 602 and external applications (e.g., remote systems and applications) for allowing user control, monitoring, and adjustment to the ratings platform 602 and/or the devices that communicate with the ratings platform 602 (e.g., the user device 610, the storage system 620, components of the BMS 400, the BMS 500, etc.). The ratings platform 602 can be configured to communicate with external systems and/or devices using any of a variety of communications protocols (e.g., HTTP(S), WebSocket, CoAP, MQTT, etc.), industrial control protocols (e.g., MTConnect, OPC, OPC-UA, etc.), process automation protocols (e.g., HART, Profibus, etc.), home automation protocols, or any of a variety of other protocols. Advantageously, the ratings platform 602 can receive, ingest, and process data from any type of system or device regardless of the communications protocol used by the system or device.

The ratings platform 602 can be configured to communicate with the user device 610. The user device 610 can include a user interface (shown as a chillers selection tool 712) and/or application programing interface(s) ("API(s)") (shown as a CSPS API 714, a reports API 716, etc.). As mentioned above, the user device 610 may be a computing device having a memory (e.g., RAM, ROM, Flash memory, hard disk storage, etc.), a processor (e.g., a general purpose processor, an application specific integrated circuit (ASIC), one or more field programmable gate arrays (FPGAs), a group of processing components (or other suitable electronic processing components), and/or a user interface (e.g., a touch screen), allowing a user to interact with the ratings platform 602.

The chillers selection tool 712 may be a user interface that enables a user to input desired building equipment device input data. According to an exemplary embodiment, the desired device input data includes an attribute characterizing the device (or a plurality thereof), a device characteristic (or plurality thereof), and/or any other suitable data relating to a desired device configuration. For example, the device input data may include, but is not limited to: a desired device family, application, power consumption, location of use, model, etc.; whether the device includes a noise reduction kit, compressor variation, sensors, etc.; the type of refrigerant, coils, fans, etc. of the device; the device's full load rating standard, conditions, capacity, etc.; the device's evaporator temperature, flow rate, etc.; the device's condenser ambient temperature, maximum fan frequency, etc.; and/or other characteristics relevant to the device configuration (e.g., cost-efficiency, energy efficiency, altitude or air temperature during use, the size and type of the building the device is a component of, etc.). In some embodiments, the device characteristic, or other suitable data relating to a desired configuration, are included in the attributes characterizing the device. In an exemplary embodiment, the chillers selection tool 712 is also configured to communicate the device input data to the ratings platform 602 (e.g., in the form of a device rating request) for further processing, as discussed below.

The user device 610 may also include APIs (e.g., CSPS API 714, Reports API 716, etc.) that are configured to interact with web-based applications and/or systems to receive, process, send, etc. data. For example, the CSPS API 714 may receive device input data from the chillers selection tool 712. Based on the device input data, and algorithms and/or predetermined rules (e.g., components that are compatible with each other, components that satisfy user-specified performance requirements, components that physically fit within a selected housing, etc.), the CSPS API 714 may determine or generate a plurality of possible device configurations (e.g., unique sets of components capable of being included the device). In some embodiments, the CSPS API 714 generates the plurality of possible device configurations using some or all of the rules and/or techniques described in U.S. patent application Ser. No. 17/388,514, filed Jul. 29, 2021, the entire disclosure of which is incorporated by reference herein. The CSPS API 714 may further be configured to communicate the list of possible device configurations (e.g., in the form of device configuration data) to components of the ratings platform 602 (e.g., a device batch orchestrator, etc.) for further processing and/or external systems or devices for storage. In some embodiments, the CSPS API 714 is also configured to receive device data from the ratings platform 602 (e.g., after processing by the ratings platform 602), and/or communicate device data to other devices or systems. For example, the CSPS API 714 may be configured to receive ratings from the ratings platform 602, and/or communicate the ratings to an external device for storage and/or the chillers selection tool 712 to be displayed on the user device 610.

In some embodiments, the user device also includes the reports API 716. The reports API 716 may receive report data (e.g., device report data, including device attributes, characteristics, specifications, etc.) from an external system or device, and communicate the report data to other external systems or devices for processing and/or storage.

The ratings platform 602 may also be configured to communicate with the storage system 620. The storage system 620 may include a building equipment device database (e.g., chillers database 722, the building equipment device database 622 of FIG. 6, etc.), an API database (shown as a CSPS database 724), and a pricing database (shown as a CSPS pricing database 726). The chillers database 722 may receive, store, and/or send desired device attributes or characteristic, and/or a list of possible device configurations. For example, the chillers database 722 may receive and store desired device input data from the chillers selection tool 712, and/or device configuration data from the CSPS API 714. The CSPS database 724 may receive and store possible device configurations and/or device ratings. For example, the CSPS database 724 may receive and store device configuration data from the CSPS API 714, and/or rating data from the CSPS API 714 (e.g., via the ratings platform 602 after processing). The CSPS pricing database 726 may receive and store device pricing information. For example, the CSPS pricing database 726 may receive and store device pricing data from the CSPS API 714 (e.g., directly, or via the ratings platform 602 after processing).

The ratings platform 602 may also be configured to communicate with the BMS 400 and/or the BMS 500 (e.g., via the network 604). The ratings platform 602 may receive device input data from the BMS 400 and/or the BMS 500, which may include data from any number of devices, controllers, and connections of the BMS 400 and/or the BMS 500 (e.g., via the HVAC subsystem 440, the security subsystem 438, the lighting subsystem 442, the fire safety subsystem 430, etc.). The ratings platform 602 may determine a device rating, and communicate the device rating to the BMS 400 and/or the BMS 500 to complete control activities. The ratings platform 602 may also communicate a rating to the BMS 400 and/or the BMS 500 in order to control the device and/or other devices of a building.

Still referring to FIG. 7, the ratings platform 602 is generally shown to include a processing circuit 704 including a processor 706 and a memory 708. While shown as single components, it will be appreciated that the ratings platform 602 may include one or more processing circuits including one or more processors and memory. In some embodiments, the ratings platform 602 includes a plurality of processors, memories, interfaces, and other components distributed across multiple devices or systems that are communicably coupled via the network 604. For example, in a cloud-based or distributed implementation, the ratings platform 602 may include multiple discrete computing devices, each of which includes a processor 706, memory 708, communications interface 702, and/or other components of the ratings platform 602 that are communicably coupled via the network 604. Tasks performed by the ratings platform 602 can be distributed across multiple systems or devices, which may be located within a single building or facility, or distributed across multiple buildings or facilities. In other embodiments, the ratings platform 602 itself is implemented within a single computer (e.g., one server, one housing, etc.). All such implementations are contemplated herein.

The processor 706 can be a general purpose or specific purpose processor, an application specific integrated circuit (ASIC), one or more field programmable gate arrays (FPGAs), a group of processing components, or other suitable processing components. The processor 706 may be configured to execute computer code or instructions stored in the memory 708 or received from other computer readable media (e.g., CDROM, network storage, a remote server, etc.).

The memory 708 can include one or more devices (e.g., memory units, memory devices, storage devices, etc.) for storing data and/or computer code for completing and/or facilitating the various processes described in the present disclosure. The memory 708 can include random access memory (RAM), read-only memory (ROM), hard drive storage, temporary storage, non-volatile memory, flash memory, optical memory, or any other suitable memory for storing software objects and/or computer instructions. Memory 708 can include database components, object code components, script components, or any other type of information structure for supporting the various activities and information structures described in the present disclosure. The memory 708 can be communicably connected to the processor 706 via the processing circuit 704 and can include computer code for executing (e.g., by the processor 706) one or more processes described herein. When the processor 706 executes instructions stored in the memory 708, the processor 706 generally configures the processing circuit 704 to complete such activities.

Still referring to FIG. 7, the ratings platform 602 (e.g., the memory 708) is shown to include a device batch orchestrator, a device rating service, a device rating cache database, and a device rating storage. According to an exemplary embodiment, the device batch orchestrator is a chillers batch orchestrator 720 (hereinafter "CBO 730"), the device rating service is a chillers rating service 732, the device rating cache database is a chillers rating cache database 734 (hereinafter "CRC database 734"), and the device rating storage is a chillers rating storage 736. As discussed above, the CBO 730, chillers rating service 732, CRC database 734, and chillers rating storage 736 may obtain/receive/retrieve a device profile (e.g., from the user device 610, the storage system 620, the BMS 400, the BMS 500, etc.), and provide a rating to components of the ratings platform 602 and/or external devices or systems (e.g., the user device 610, the storage system 620, the BMS 400, the BMS 500, etc.). In some embodiments, CBO 730, chillers rating service 732, CRC database 734, and chillers rating storage 736 may obtain/receive/retrieve a rating request (e.g., from the user device 610, the storage system 620, the BMS 400, the BMS 500, etc.), and provide a rating to components of the ratings platform 602 and/or external devices or systems (e.g., the user device 610, the storage system 620, the BMS 400, the BMS 500, etc.). The following paragraphs describe some of the general functions performed by each of the components 720-726 of the ratings platform 602.

Although the components of the ratings platform 602 are primarily described as receiving a rating request in the present disclosure, the systems and methods described herein are not limited to receiving a rating request. It is contemplated that the rating request may be obtained, received, and/or retrieved (e.g., proactively, retroactively, etc.) as a device profile. For example, in an exemplary embodiment a device profile is obtained (e.g., as part of a rating request, from a database, from another data source, etc.). In some embodiments, the device profile is received (e.g., as part of a rating request, from a user device, from a database, from another data source, etc.). In other embodiments, the device profile is retrieved (e.g., as part of a rating request, from a database, from another data source, etc.). In yet other embodiments, the device profile is autonomously retrieved (e.g., pulled), retroactively, proactively, or otherwise by components of the ratings platform 602 and/or any other suitable data source.

In an exemplary embodiment, the CBO 730 is configured to receive a device rating request via the communications interface 702. The device rating request may include desired device input data, a list of possible device configurations, and/or any other suitable data relating to device configurations and/or conditions. For example, the CBO 730 may receive a device rating request that includes a plurality of attributes characterizing a device and/or desired device characteristic(s) from the chillers selection tool 712 (e.g., device input data), a list of possible device configurations from the CSPS API 714 (e.g., device configuration data), and/or any other suitable data relating to a device configuration and/or condition from other external systems or devices (e.g., the ratings platform 602, the storage system 620, components of the BMS 400 or BMS 500 via the network 604, etc.).

The CBO 730 may further be configured to translate (e.g., parse, split, divide, process, etc.) the rating request data into a plurality of datasets. For example, the CBO 730 may receive a rating request that includes a plurality of attributes characterizing a building equipment device, a first device characteristic, a second device characteristic, a third device characteristic, etc. The CBO 730 may translate the rating request data into a first dataset (e.g., the plurality of device attributes, etc.), a second dataset (e.g., the first device characteristic, etc.), a third dataset (e.g., the second device characteristic, etc.), a fourth dataset (e.g., the third device characteristic, etc.), etc. In some embodiments, the CBO 730 translates the rating request data into another first dataset (e.g., a first portion of the plurality of device attributes, etc.), another second dataset (e.g., a second portion of the plurality of device attributes, etc.), another third dataset (e.g., the first device characteristic and/or the second device characteristic), another fourth dataset (e.g., the third device characteristic), etc. It should be understood that in various embodiments, the translated rating request data may include any number of possible datasets, and the datasets may include any combination of data included in the rating request.

The CBO 730 may also be configured to translate (e.g., split, process, etc.) the rating request data into datasets and data subsets. For example, the CBO 730 may receive a rating request that includes a plurality of attributes characterizing a building equipment device, a first device characteristic, a second device characteristic, a third device characteristic, etc. The CBO 730 may translate the rating request data into a first dataset (e.g., the plurality of device attributes, etc.) that includes a first data subset (e.g., the first device characteristic), and a second dataset (e.g., the second device characteristic). In some embodiments, the CBO 730 translates the rating request into another first dataset (e.g., a first portion of the plurality of device attributes, etc.) that includes another first data subset (e.g., the third device characteristic), and a second dataset (e.g., a second portion of the plurality of device attributes, etc.) that includes a second data subset (e.g., the second device characteristic). It should be understood that in various embodiments, the translated rating request data may include any number of possible datasets and/or data subsets, and the datasets and/or data subsets may include any combination of data included in the rating request.

According to an exemplary embodiment, the CBO 730 is also configured to determine which of a plurality of rating engines is configured to determine a device rating. According to an exemplary embodiment, the CBO 730 receives a rating request, translates the rating request data into dataset(s) and/or data subset(s), and determines (based on the dataset(s) and/or data subset(s)) which of the plurality of rating engines is configured to determine a rating. In an exemplary embodiment, the CBO 730 is also configured to communicate the appropriate dataset(s) and/or data subset(s) to the appropriate rating engine (e.g., via the chillers rating service 732, a service bus, etc.), as discussed below.

For example, the CBO 730 may receive a rating request that includes a plurality of attributes characterizing a device, a first device characteristic, a second device characteristic, a third device characteristic, etc. The CBO 730 may translate the rating request data into a first dataset (e.g., the plurality of device attributes, etc.), a first data subset (e.g., the first device characteristic), a second dataset (e.g., the second device characteristic), etc., or any combination thereof. The CBO 730 may determine a first rating engine is configured to determine a first rating based on the first dataset and/or the first data subset (e.g., the plurality of device attributes and/or the first device characteristic). In some embodiments, the CBO 730 may also determine a second rating engine is configured to determine a second rating based on the first dataset and/or the second dataset (e.g., the plurality of device attributes and/or the second device characteristic). It should be understood that in various embodiments, the translated rating request data may include any number of suitable datasets and/or data subsets, and based on the dataset(s) and/or data subset(s), the CBO 730 may determine a rating engine (or plurality thereof) is/are configured to determine a rating (or plurality thereof). The CBO 730 may then communicate the dataset(s) and/or data subset(s) to the appropriate rating engine(s) (e.g., the first dataset and/or the first data subset to the first rating engine, the second dataset to the second rating engine, etc.), as discussed below. In an exemplary embodiment, the CBO 730 is configured to asynchronously communicate the appropriate dataset(s) and/or data subset(s) to the rating engine(s), in order for the rating engine(s) to asynchronously process the translated rating request data to provide device ratings. In some embodiments, the CBO 730 is also configured to communicate the dataset(s) and/or sub dataset(s) to the rating engine(s) in series, in order for the rating engine(s) to process the translated rating request data in series to provide device ratings.

Still referring to FIG. 7, the CBO 730 is also shown to communicate with the chillers rating service 732, the CRC database 734, and/or the chillers rating storage 736. The CRC database 734 can be configured to receive, store, and send device data, and rating data, in order to provide a device rating and/or control a device. For example, the CRC database 734 may receive translated rating request data from the CBO 730 and/or the chillers rating service 732, and rating data from the chillers rating storage 736. The CRC database 734 can store (e.g., cache, etc.) the device data and the rating data, for example, for use in subsequent rating requests as discussed below. In some embodiments, the CRC database 734 is searchable (e.g., for device data, rating data, etc.), such that components of the ratings platform 602 (e.g., the CBO 730, the chillers rating service 732, etc.) can determine whether device data and/or rating data is stored in the CRC database 734. In this regard, the CRC database 734 may also be configured to send cached device data and/or rating data to other components of the ratings platform (e.g., the CBO 730, the chillers rating service 732, etc.), for example, in subsequent rating requests and/or to control the device. In this regard, the CRC database 734 can store and communicate device data and rating data in order to increase the speed and/or efficiency of subsequent rating requests, for example, by replicating a previous rating request and/or providing a foundational dataset for subsequent requests.

The chillers rating storage 736 can also receive, store, and send device data and/or device rating data in order to provide a device rating and/or control a device. For example, the chillers rating storage 736 may receive translated rating request data from the CBO 730, and store the translated rating request (e.g., in batches, in a batch container 744). The chillers rating storage 736 may also receive device ratings from a plurality of rating engines (as discussed below), and store the rating data (e.g., in batches, in a ratings container 742). In some embodiments, the chillers rating storage 736 is searchable (e.g., for device data, rating data, etc.), such that components of the ratings platform 602 (e.g., the CBO 730, the chillers rating service 732, etc.) can determine whether device data and/or rating data is stored in the chillers rating storage 736. In this regard, the chillers rating storage 736 may be configured to send device data and/or rating data to other components of the ratings platform 602 (e.g., the chillers rating service 732, the CBO 730, etc.), for example, in subsequent rating requests and/or to control the device. Similar to the CRC database 734, the chillers rating storage 736 may store and communicate device data and/or rating data to increase the speed and/or efficiency of subsequent rating requests, for example, by replicating a previous rating request and/or providing a foundational dataset for subsequent requests.

The chillers rating service 732 may be configured to communicate translated rating request data, device rating data, and/or other suitable device data to other components of the ratings platform 602. According to an exemplary embodiment, the chillers rating service 732 receives translated rating request data from the CBO 730, and sends the translated rating request data to a rating engine (or a plurality thereof) via a service bus. In some embodiments, the chillers rating service 732 also receives instructions (e.g., a HTTP message, etc.) from the CBO 730 that indicate which of the plurality of rating engines is configured to determine a device rating. As will be discussed in greater detail below, the chillers rating service 732 may receive translated rating request data and/or instructions from the CBO 730, and send the appropriate datasets and/or data subsets (or a plurality thereof) to the appropriate rating engine (or a plurality thereof) via a service bus.

The chillers rating service 732 can also be configured to communicate with the CRC database 734 and/or the chillers rating storage 736. In an exemplary embodiment, after the chillers rating service 732 receives the translated rating request data, the chillers rating service is configured to communicate with the CRC database 734 and/or the chillers rating storage 736 to determine whether the translated rating request data, or a portion thereof (e.g., a dataset, a data subset, etc.), is stored in the CRC database 734 and/or the chillers rating storage 736. If the chillers rating service 732 determines the translated rating request data, or a portion thereof, is stored in the CRC database 734 and/or the chillers rating storage 736, the chillers rating service 732 may receive (e.g., from the CRC database 734, the chillers rating storage 736, the ratings container 742, etc.) translated rating request data, rating data, and/or other suitable data used to generate a device rating and/or control a device. However, if the chillers rating service 732 determines that the translated rating request data, or a portion thereof, is not stored in the CRC database 734 and/or the chillers rating storage 736, the chillers rating service 732 may communicate the translated rating request data to the CRC database 734 and/or the chillers rating storage 736 for storage, as discussed above. In addition, if the chillers rating service 732 determines the translated rating request data, or a portion thereof, is not stored, the chillers rating service 732 may also communicate the appropriate dataset(s) and/or data subset(s) to the appropriate rating engine(s) via the chillers rating service bus 738. Similar to the CBO 730, in an exemplary embodiment the chillers rating service 732 is configured to communicate the appropriate dataset(s) and/or data subset(s) to the appropriate rating engine(s) asynchronously (e.g., for asynchronous processing, etc.) and/or in series (e.g., for processing in series, etc.). In this regard, the chillers rating service 732 may be configured to receive translated rating request data, determine if the translated rating request data (or a portion thereof) is stored in the ratings platform 602, and receive translated rating request data, rating data, etc. from components of the ratings platform 602, and/or communicate the appropriate data to the appropriate rating engine(s) for asynchronous and/or in series processing.

Referring still to FIG. 7, the ratings platform 602 is shown to include a chillers rating service bus 750 (including buses 752-764) and a plurality of rating engines 770-790. In an exemplary embodiment, the chillers rating service 732 may send dataset(s) and/or data subset(s) to rating engine(s) 770-790, either directly or via the chillers rating service bus 750 (e.g., buses 752-764). In an exemplary embodiment, the chillers rating service 732 is connected with rating engines 770-782 via separate buses. For example, the chillers rating service 732 may be connected with an AECWorks rating engine 770 via an aecworks bus 752, a DXChill ratings engine 772 via a dxchill bus 754, a EcoDesign Calcuator engine 774 via a ecodesign bus 756, a HiselA ratings engine 776 via a hisela bus 758, a Interpolation ratings engine 778 via an interpolation bus 760, a TWEI ratings engine via a tewi bus 762, and a Xegine ratings engine 782 via a xengine bus 764. Also in an exemplary embodiment, the chillers rating service 732 is connected with rating engines 786-790 (e.g., Armstrong rating engine 786, STC Sound rating engine 788, M Standards Calculator engine 790, etc.) directly via a variety of communications protocols (e.g., HTTP(S), etc.).

The rating engines 770-790 can be configured to receive specific translated rating request data (e.g., specific dataset(s), data subset(s), etc.), and provide a device rating that can be used to generate a predictive model for a device and/or control the device. In an exemplary embodiment, the device rating may include, but is not limited to: overall device configuration, device energy efficiency, cost efficiency, device optimization, component parts, component part configurations, etc.; device power consumption, performance, sound production, flow characteristics, output production, etc.; device certifications, specification, regulatory requirements, etc.

As discussed above, the chillers rating service 732 may communicate specific translated rating request data (e.g., specific dataset(s), data subset(s), etc.) to rating engine(s) 770-790, directly or via the chillers rating service bus 750, asynchronously, in series, or at any other suitable interval of time. For example, the chillers rating service 732 may asynchronously communicate translated rating request data (e.g. from a request, having 25, 50, 100, 500, etc. translated dataset(s), data subset(s), etc.) to the rating engine(s) 770-790. The rating engine(s) 770-790 may receive specific translated rating request data, and provide a plurality of device ratings (e.g., 25, 50, 100, 500, etc.) asynchronously. In this regard, the rating engine(s) 770-790 may simultaneously process (e.g., asynchronously compute, etc.) translated rating request data, in order to simultaneously provide device ratings. In some embodiments, the chillers rating service 732 may communicate translated rating request data to rating engine(s) 770-790 in series. The rating engine(s) 770-790 may receive specific translated rating request data (sometimes in sequence), and provide a plurality of device ratings in series. In this regard, the rating engine(s) 770-790 may also process (e.g., compute in series) translated rating request data, in order to provide device ratings based on sequential computations and/or over a predetermined period of time.

The rating engines 770-790 can also be configured to communicate device ratings to the chillers rating storage 736 and/or the chillers rating mappings database 796 for storage. As discussed above, the chillers rating storage 736 may receive rating data from the rating engine(s) 770-790, store the rating data (e.g., in the ratings container 742, etc.), and/or further communicate the rating data to other components of the ratings platform 602 (e.g., the chillers rating service 732, the CBO 730, etc.). The chillers rating mappings database 796 may similarly receive rating data from the rating engine(s) 770-790, store the rating data, and/or communicate the rating data with other components of the ratings platform 602. In this regard, the chillers rating storage 736 and/or the chillers rating mappings database 796 can store and communicate rating data in order to increase the speed and/or efficiency of subsequent rating requests, for example, by replicating a previous rating request and/or providing a foundational dataset for subsequent requests.

Figure 8:
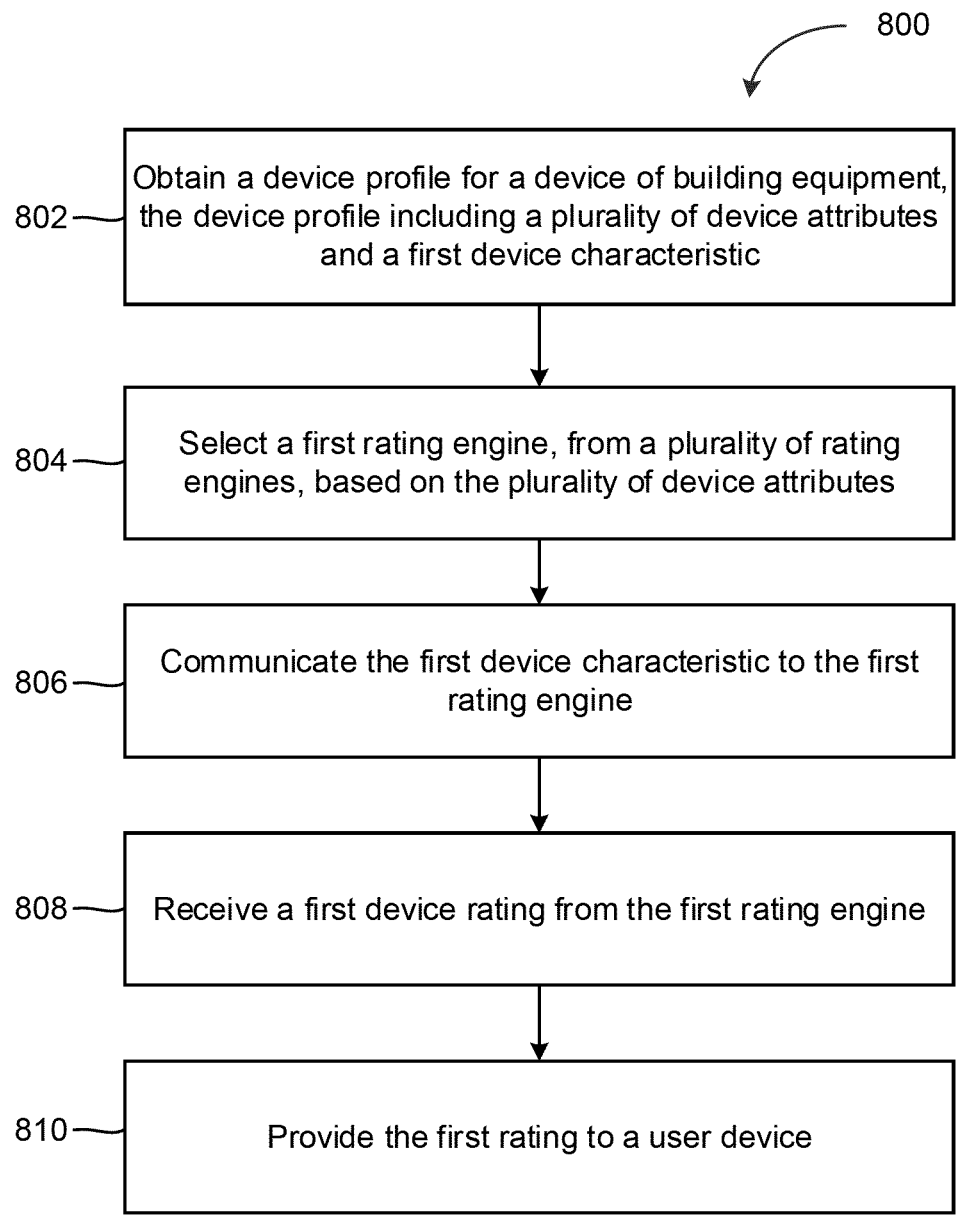
FIG. 8 is a flow diagram of an example process for providing a rating for building equipment, according to some embodiments.

Referring now to FIG. 8, a flow diagram of a process 800 for providing a device rating for a building equipment device is shown, according to some embodiments. Process 800 may be implemented by the web services system 600 of FIG. 6 and/or the ratings platform 602 of FIGS. 6-7. Process 800 may also be implemented using the components of FIGS. 1-5. It should be appreciated that all or part of the process 800 may be implemented by other systems, devices, and/or components (e.g., components of the ratings platform 602, the BMS 400, the BMS 500, etc.). It should also be appreciated that certain steps of process 800 may be optional and, in some embodiments, the process 800 may be implemented using less than all of the steps.

At step 802, a device profile for a device of building equipment is obtained. As discussed above, it is contemplated that the device profile may be obtained (e.g., received, retrieved, autonomously retrieved retroactively, proactively, or otherwise, etc.) from any suitable source (e.g., as part of a rating request, from a database, from another data source). For example, the device profile may be obtained via a user interface of a user device, such as the chillers selection tool 712 of the user device 610. The device profile may also be obtained via an API of a user device, such as the CSPS API 714 of the user device 610. In some embodiments, the device profile is obtained from a storage system and/or a database, for example the storage system 620 and/or the chillers database 722. In other embodiments, the device profile is obtained from components of a building management system, for example the BMS controller 366 of the BMS 400 and/or the system manager 502 of the BMS 500. In yet other embodiments, the device profile is obtained via a combination of a user device (e.g., a user interface, an API, etc.), a storage system, and/or a building management system.

According to an exemplary embodiment, the device profile includes a plurality of attributes characterizing the device of building equipment, including at least a first device characteristic. The plurality of device attributes and/or the first device characteristic may include, but are not limited to: a desired device family, application, power consumption, location of use, model, etc.; whether the device includes a noise reduction kit, compressor variation, sensors, etc.; the type of refrigerant, coils, fans, etc. of the device; the device's full load rating standard, conditions, capacity, etc.; the device's evaporator temperature, flow rate, etc.; the device's condenser ambient temperature, maximum fan frequency, etc.; and/or other characteristics relevant to the device configuration (e.g., cost-efficiency, energy efficiency, altitude or air temperature during use, the size and type of the building the device is a component of, etc.). In some embodiments, the first device characteristic is included in the plurality of device attributes characterizing the device. In other embodiments, the device profile includes a second device characteristic, a third device characteristic, etc., which are also included in the plurality of device attributes characterizing the device.

At step 804, a first rating engine is selected from a plurality of rating engines. The first rating engine may be selected via a device batch orchestrator, such as CBO 730. The first rating engine may also be selected via a device rating service, such as chillers rating service 732. In some embodiments, the first rating engine is selected via a device rating service (e.g., the chillers rating service 732) after receiving instructions from a device batch orchestrator (e.g., the CBO 730). In other embodiments, the first rating engine is selected via another suitable system or device. In yet other embodiments, the first rating engine is selected based on translated device profile data, as discussed below.

According to an exemplary embodiment, the first rating engine is selected from the plurality of rating engines based on the plurality of attributes characterizing the device of building equipment. After the device profile is obtained, the device profile data may be translated into dataset(s) and/or data subset(s) via a device batch orchestrator (e.g., the CBO 730), a device rating service (e.g., the chillers rating service 732), and/or another suitable system or device. For example, the device profile may be translated into a first dataset (e.g., the plurality of device characteristics, etc.), a second dataset (e.g., the first device characteristic, etc.), a third dataset (e.g., a second device characteristic, etc.), etc. Similarly, the device profile may also be translated into a first dataset (e.g., the plurality of device characteristics, etc.), a first data subset (e.g., the first device characteristic, etc.), a second dataset or second data subset (e.g., a second device characteristic, etc.), etc. According to an exemplary embodiment, the first rating engine is selected from the plurality of rating engines based on the dataset (or data subset) comprising the plurality of attributes characterizing the device of building equipment (e.g. the first dataset, above etc.). In some embodiments, the first rating engine is selected based on another feature or features (e.g., dataset(s), data subset(s), etc.), such as a device characteristic, a device configuration, or other suitable data relating to a device configuration.

In some embodiments, the device profile data may also be communicated to a database or a storage system to be stored. For example, after the device profile is obtained and the device profile data is translated into dataset(s) and/or data subset(s), the translated device profile data may be communicated to a database or a storage system to be stored. A device batch orchestrator (e.g., the CBO 730) may communicate the translated device profile data to a database to be stored (e.g., cached), such as the chillers rating cache database 734. A device batch orchestrator (e.g., the CBO 730) may also communicate the translated device profile data to a storage system to be stored (e.g., in batches), such as the batch container 744 of the chillers rating storage 736. Similarly, a device rating service (e.g., the chillers rating service 732) may communicate the translated device profile data to a database to be stored (e.g., cached), such as chillers rating cache database 734, and/or a storage system to be stored (e.g., in batches), such as the batch container 744 of the chillers rating storage 736.

In some embodiments, a second rating engine is also selected from the plurality of rating engines based on the plurality of attributes characterizing the device of building equipment. For example, after the device profile is obtained and the device profile data is translated into dataset(s) and/or data subset(s), a second rating engine is selected from the plurality of rating engines. Similar to the first rating engine, the second rating engine may be selected via a device batch orchestrator (e.g., the CBO 730), a device rating service (e.g., the chillers rating service 732), and/or another suitable system or device. The second rating engine may also be selected from the plurality of rating engines based on the plurality of attributes characterizing the device of building equipment (e.g., the first dataset, above, etc.), or other features (e.g., dataset(s), data subset(s), etc.), such as a device characteristic, a device configuration, or other suitable data relating to a device configuration.

At step 806, the first device characteristic is communicated to the first rating engine. As discussed above, after the device profile is obtained and the device profile data is translated, the dataset(s) and/or data subset(s) comprising the first device characteristic may be communicated to the first rating engine. The first device characteristic may be communicated from a device rating service (e.g., the chillers rating service 732) directly to the first rating engine via a variety of communications protocols, such as HTTP(S). The first device characteristic may also be communicated to the first rating engine via a service bus, such as the chillers rating service bus 750. In some embodiments, the first device characteristic is communicated to the first rating engine (e.g., via the chillers rating service bus 750) via a specific bus (e.g., buses 752-764) connected to the first rating engine. In other embodiments, another feature other than the first device characteristic is communicated to the first rating engine, for example, a device configuration, a plurality of device attributes, or other suitable data relating to a device configuration.

In some embodiments, the second device characteristic is also communicated to the second rating engine. Similar to the first device characteristic, the second device characteristic may be communicated from a device rating service (e.g., the chillers rating service 732) directly to the second rating engine, or indirectly via a service bus (e.g., the chillers rating service bus 750 and/or specific buses 752-764 connected to the second rating engine). In an exemplary embodiment, the first device characteristic is communicated to the first rating engine, and the second device characteristic is communicated to the second rating engine, asynchronously. In other embodiments, the first device characteristic is communicated to the first rating engine, and the second device characteristic is communicated to the second rating engine, in series.

At step 808, a first rating for the device of building equipment is received from the first rating engine. According to an exemplary embodiment, the first rating engine receives the first device characteristic (e.g., dataset(s), data subset(s), etc.), and determines a first rating for the device (e.g., based on the plurality of device attributes and/or the first device characteristic, etc.). In an exemplary embodiment, the rating may include, but is not limited to: overall device configuration, device energy efficiency, cost efficiency, device optimization, component parts, component part configurations, etc.; device power consumption, performance, sound production, flow characteristics, output production, etc.; device certifications, specification, regulatory requirements, etc.

In some embodiments, the first rating engine communicates the first rating to a storage system and/or database to be stored. The first rating engine may communicate the first rating to a storage system to be stored (e.g., in batches), such as the ratings container 742 of the chillers rating storage 736. The first rating engine may also communicate the first rating to a database to be stored (e.g., mapped), such as chillers rating mappings database 796.

In some embodiments, the second rating engine also receives the second device characteristic, and determines a second rating (e.g., based on the plurality of device attributes and/or the second device characteristic). In an exemplary embodiment, the first rating engine determines the first rating, and the second rating engine determines the second rating, asynchronously. In some embodiments, the first rating engine determines the first rating, and the second rating engine determines the second rating, in series. Like the first rating engine, the second rating engine may communicate the second rating to a storage system (e.g., the chillers rating storage 736) and/or a database (e.g., the chillers rating mappings database 796) to be stored. The second rating engine may further communicate the second rating to a device rating service (e.g., the chillers rating service 732) and/or a device batch orchestrator (e.g., the CBO 730).

At step 810, the first rating is provided to a user device. According to an exemplary embodiment, once the first rating is received, the first rating may be communicated to a user device (e.g., the user device 610) via a communications interface (e.g., the communications interface 702). The first rating may be displayed on the user device 610 via a user interface (e.g., the chillers selection tool 712) and/or an API (e.g., the CSPS API 714). In an exemplary embodiment, the first rating includes a desirable device configuration, suitable components of the device, a degradation state of components of the device, and/or any other suitable device characteristic, for example for use in sales and/or marketing of the device. In some embodiments, the second rating is also received, and the second rating is provided to the user device. Similar to the first rating, the second rating may be communicated to the user device 610 via the communications interface 702, and displayed via the chillers selection tool 712 and/or the CSPS API 714. Further, like the first rating, the second rating may include a desirable device configuration, suitable components of the device, a degradation state of components of the device, etc., which may be used in sales and/or marketing of the device.

Referring still to FIG. 8, it should be appreciated that following step 810, certain steps of process 800 may be repeated, executed in sequence, and/or implemented using less (or more) than all of the steps of the process 800. In this regard, following step 810 a subsequent device profile for a device of building equipment may be obtained, as discussed below.

A subsequent device profile may be obtained, for example via a user interface or API of a user device (e.g., chillers selection tool 712 or CSPS API 714 of user device 610), a storage system (e.g., storage system 620), and/or a building management system (e.g., BMS 400, BMS 500, etc.).

A determination may then be made whether the subsequent device profile data, or a portion thereof, is stored in a database and/or a storage system. For example, a device batch orchestrator (e.g., CBO 730) and/or a device rating service (e.g., chillers rating service 732) may communicate with a database (e.g., chillers rating cache database 734) and/or a storage system (e.g., chillers rating storage 736), and determine whether the subsequent device profile data, or a portion thereof (e.g., a translated device profile dataset, data subset, etc.), is stored in the database and/or storage system.

If it is determined that the subsequent device profile data, or a portion thereof, is stored in the database and/or the storage system, the subsequent device profile data, or a portion thereof, may be received from the database and/or the storage system. For example, once it is determined the subsequent device profile data is stored, a device batch orchestrator (e.g., CBO 730) and/or a device rating service (e.g., chillers rating service 732) may receive the subsequent device profile data, or a portion thereof (e.g., a translated device profile dataset, data subset, etc.), from the database (e.g., chillers rating cache database 734) and/or a the storage system (e.g., batch container 744 of the chillers rating storage 736).

In addition, if it is determined that the subsequent device profile data, or a portion thereof, is stored, a rating associated with the subsequent device profile may be received from the database and/or storage system. For example, a device batch orchestrator (e.g., CBO 730) and/or a device rating service (e.g., chillers rating service 732) may receive rating data associated with the subsequent device profile data from the database (e.g., chillers rating cache database 734) and/or the storage system (e.g., ratings container 742 of the chillers rating storage 736).

If it is determined that the subsequent device profile data, or a portion thereof, is not stored in the database and/or storage system, the subsequent device profile data, or a portion thereof, may be communicated to the database and/or the storage system to be stored. For example, a device batch orchestrator (e.g., CBO 730) and/or a device rating service (e.g., chillers rating service 732) may communicate the subsequent device profile data, or a portion thereof (e.g., a translated device profile dataset, data subset, etc.), to a database (e.g., chillers rating cache database 734) and/or a storage system (e.g., batch container 744 of the chillers rating storage 736) for storage, as discussed in step 804.

In addition, if it is determined that the subsequent device profile data, or a portion thereof, is not stored in the database and/or storage system, the subsequent device profile data, or a portion thereof, may be communicated to a rating engine. For example, a device batch orchestrator (e.g., CBO 730) and/or a device rating service (e.g., chillers rating service 732) may communicate the subsequent device profile data, or a portion thereof (e.g., a translated device profile dataset, data subset, etc.), to a rating engine (or a plurality thereof), as discussed in steps 804-806.

As an illustrative example, a user may request a rating for a building equipment device. In an exemplary embodiment, the user may provide a device profile to a ratings platform via a user interface of a user device. The device profile may include, for example, desired device attributes, characteristics, and/or any other suitable information relating to a device configuration. Components of the ratings platform may obtain the device profile, and communicate the device profile data to databases and/or storage systems for storage. The components of the ratings platform may also select, from a plurality of rating engines, a first rating engine that is configured to determine a first rating, for example based on the device attributes. The components may then communicate a first device characteristic to the first rating engine, and the first rating engine may determine a first rating (e.g., based on device attributes, the first characteristic, and/or other data). The first rating may include, for example, a device configuration (e.g., most cost efficient, most energy efficient, etc.), suitable components of the device, a degradation state of components of the device, etc. The first rating may be communicated to other components of the ratings platform, and/or the user interface of a user device to be presented to the user. In an exemplary embodiment, the first rating is communicated to the user interface to be presented to the user to be used for sales and/or marketing purposes.

In some embodiments, the components of the ratings platform may also select, from the plurality of rating engines, a second rating engine that is configured to determine a second rating. The components may communicate a second device characteristic to the second rating engine, and the second rating engine may determine a second rating (e.g., based on device attributes, the second characteristic, and/or other data). As discussed above, the first device characteristic and second device characteristic may be communicated to their respective rating engines (i.e., first rating engine, second rating engine) asynchronously or in series. In this regard, the first rating and the second rating may be communicated to other components of the ratings platform (or the user) asynchronously or in series.

As another illustrative example, a user may request an additional device rating for a building equipment device. In an exemplary embodiment, the user receives a first rating for modeling building equipment, and then requests an additional rating. The user may provide the additional device profile to the ratings platform via a user interface of a user device, which may include desired device attributes, characteristics, and/or any other suitable information relating to a device configuration. The components of the ratings platform may obtain the additional device profile, and communicate with the databases and/or storage systems to determine whether the additional device profile data (or a portion thereof) is already stored. If it is determined the additional device profile data (or a portion thereof) is already stored, components of the ratings platform receive the stored device profile data (or a portion thereof) from the databases and/or storage systems. Similarly, if the databases and/or storage systems have stored rating data associated with the additional device profile, components of the ratings platform may also receive the rating data. Conversely, if it is determined the additional device profile data (or a portion thereof) is not already stored, the additional device profile data (or a portion thereof) may be communicated to the databases and/or storage systems for storage, as well as, the appropriate rating engine.

Figure 9:
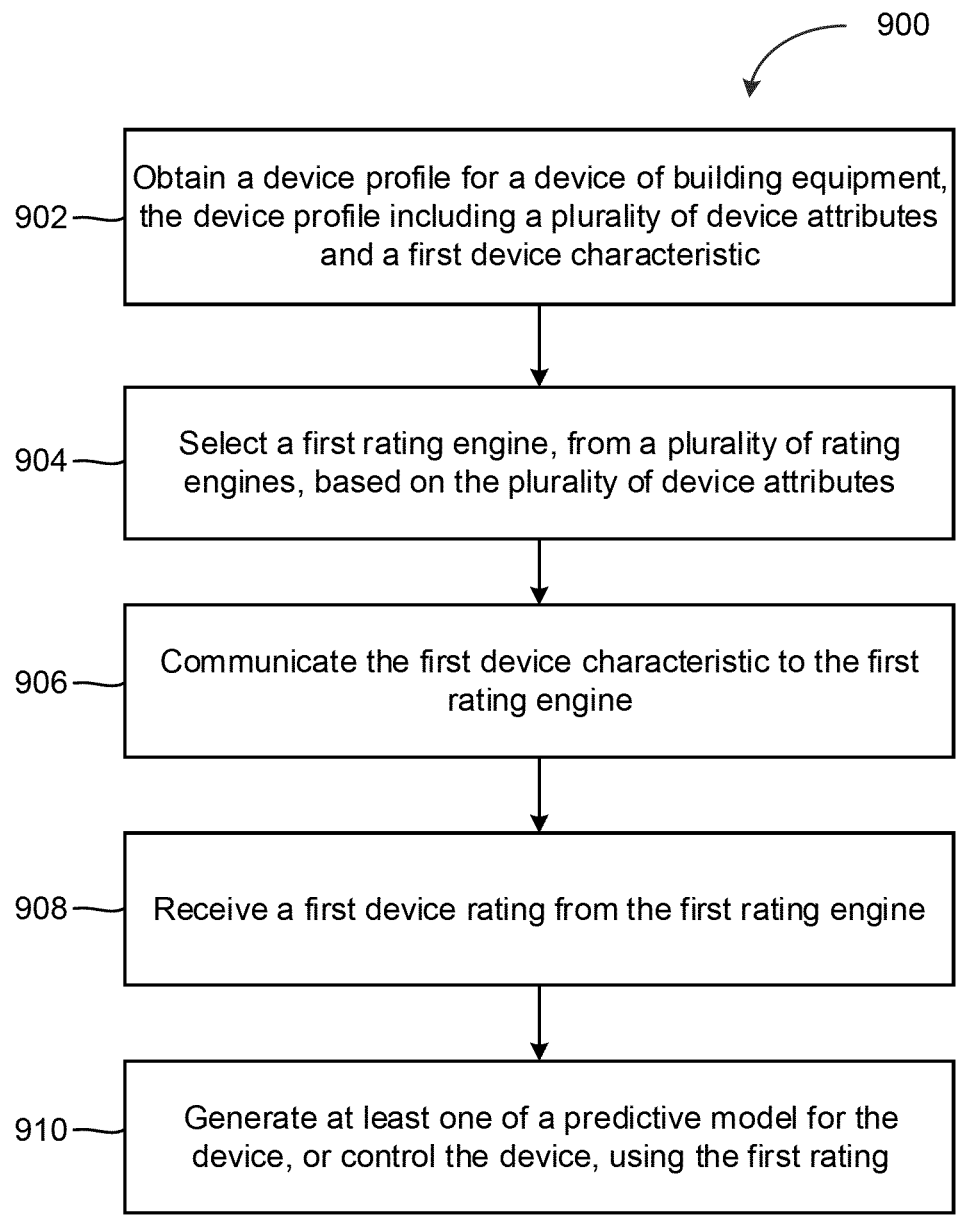
FIG. 9 is a flow diagram of an example process for modeling and controlling building equipment, according to some embodiments.

Referring now to FIG. 9, a flow diagram of a process 900 for modeling and/or controlling a building equipment device is shown, according to some embodiments. Process 900 may be implemented by the web services system 600 of FIG. 6 and/or the ratings platform 602 of FIGS. 6-7. Process 900 may also be implemented using the components of FIG. 1-5. It should be appreciated that all or part of the process 900 may be implemented by other systems, devices, and/or components (e.g., components of the ratings platform 602, the BMS 400, the BMS 500, etc.). It should be appreciated that certain steps of process 900 may be optional, and in some embodiments, the process 900 may be implemented using less than all of the steps.

At step 902, a device profile for a device of building equipment is obtained. As discussed above with regard to step 802 of FIG. 8, the device profile may be obtained (e.g., received, retrieved, autonomously retrieved retroactively, proactively, or otherwise, etc.) from any suitable source (e.g., as part of a rating request, from a database, from another data source, etc.). For example, the device profile may be obtained via a user interface of a user device (e.g., chillers selection tool 712), an API (e.g., CSPS API 714), from a storage system (e.g., storage system 620) or database (e.g., chillers database 722), from components of a building management system (e.g., BMS controller 366 of BMS 400, system manager 502 of BMS 500), or a combination thereof. The device profile may include a plurality of attributes characterizing the device of building equipment, including at least a first device characteristic. In some embodiments, the plurality of attributes characterizing the device (e.g., the device profile) also includes a second device characteristic, a third device characteristic, a fourth device characteristic, etc.

At step 904, a first rating engine is selected from a plurality of rating engines. As discussed above with regard to step 804 of FIG. 8, the first rating engine may be selected via a device batch orchestrator (e.g., CBO 730), a device rating service (e.g., chillers rating service 732), or a combination thereof. The first rating engine may be selected from the plurality of rating engines based on the plurality of attributes characterizing the device of building equipment (e.g., a dataset or data subset comprising the plurality of attributes characterizing the device of building equipment). In some embodiments, the device profile (e.g., device profile data) is also communicated to a database or storage system to be stored (e.g., chillers rating cache database 734, chillers rating storage 736, etc.). In an exemplary embodiment, a second rating engine is also selected from the plurality of rating engines based on the plurality of attributes characterizing the device of building equipment.

At step 906, the first device characteristic is communicated to the first rating engine. As discussed above with regard to step 806 of FIG. 8, the first device characteristic (e.g., dataset or data subset comprising the first device characteristic) may be communicated to the first rating engine directly, via a service bus (e.g., chillers rating service bus 750, buses 752-764), or via another suitable communications protocol. In an exemplary embodiment, the second device characteristic is communicated to the second rating engine. Similar to the first device characteristic, the second device characteristic may be communicated to the second rating engine directly, via a service bus, or via another suitable communications protocol. In an exemplary embodiment, the first device characteristic is communicated to the first rating engine, and the second device characteristic is communicated to the second rating engine, asynchronously. In other embodiments, the first device characteristic is communicated to the first rating engine, and the second device characteristic is communicated to the second rating engine, in series.

At step 908, a first rating for the device of building equipment is received from the first rating engine. As discussed above with regard to step 808 of FIG. 8, the first rating engine may receive the first device characteristic, and determine a first rating for the device. In some embodiments, the first rating engine communicates the first rating to a storage system and/or database to be stored (e.g., chillers rating storage 736, chillers rating mappings database 796, etc.), a device rating service (e.g., chillers rating service 732), a device batch orchestrator (e.g., CBO 730), a user device to be displayed via a user interface and/or an API (e.g., chillers selection tool 712, CSPS API 714, etc.), and/or any other suitable device. In some embodiments, the second rating engine also receives the second device characteristic, and determines a second rating. In an exemplary embodiment, the first rating engine determines the first rating, and the second rating engine determines the second rating, asynchronously. In some embodiments, the first rating engine determines the first rating, and the second rating engine determines the second rating, in series. Like the first rating engine, the second rating engine may communicate the second rating to any suitable component and/or device, as discussed above.

At step 910, at least one of a predictive model for the device is generated or the device is controlled using the first rating. Once the first rating is received, a predictive model for the device may be generated by a device rating service (e.g., chillers rating service 732), a device batch orchestrator (e.g., CBO 730), and/or another system or device. In an exemplary embodiment, the predictive model for the device is configured to be communicated to external systems of devices (e.g., the user device 610, the storage system 620, the BMs 400, the BMS 500, etc.). In some embodiments, the predictive model for the device is configured to include a desirable device configuration, suitable components of the device, and/or a degradation state of components of the device, which may be used, for example, in sales and/or marketing of the device. In other embodiments, the first rating is also used to control the building equipment device. For example, the first rating may be used to control components of a building management system, such as BMS controller 366 of the BMS 400 and/or the system manager 502 of the BMS 500, in order to control the building equipment device.

In some embodiments, the second rating is also received, and at least one of a predictive model for the device is generated or the device is controlled using the second rating. The predictive model for the device may be generated by a device rating service (e.g., the chillers rating service 732), a device batch orchestrator (e.g., the CBO 730), and/or another system or device. In some embodiments, the predictive model incorporates both the first rating and the second rating. According to an exemplary embodiment, the second rating is also used to control the building equipment device. For example, the second rating may be used to control components of a building management system (e.g., the BMS controller 366 of the BMS 400 and/or the system manager 502 of the BMS 500), in order to control the building equipment device.

Referring still to FIG. 9, and as discussed above with regard to process 800 of FIG. 8, it should be appreciated that following step 910, certain steps of process 900 may be repeated, executed in sequence, and/or implemented using less (or more) than all of the steps of the process 900. In this regard, following step 910 a subsequent rating request for a device (e.g., a subsequent device profile) of building equipment may be obtained, as discussed above.

As an illustrative example, a building management system may request a device rating for controlling a building equipment device. In an exemplary embodiment, a building management system may provide a device profile to a ratings platform via a network. The device profile may include, for example, device attributes, characteristics, and/or any other suitable information relating to a device configuration. Components of the ratings platform may obtain the device profile, and communicate the device profile data to databases and/or storage systems for storage. (Or, alternatively, determine the device profile data is stored, and receive the stored device profile data.) The components of the ratings platform may select, from a plurality of rating engines, an appropriate rating engine to determine a desired rating, communicate the appropriate device profile data to the appropriate rating engine, and receive a rating (as discussed above). In some embodiments, the components of the ratings platform are configured to generate a predictive model based on the rating. In an exemplary embodiment, the components of the ratings platform further communicate the rating (and/or the predictive model) to components of a building management system, in order to control the building equipment device.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A system for modeling and controlling building equipment, the system comprising:
one or more memory devices having instructions stored thereon that, when executed by one or more processors, cause the one or more processors to perform operations comprising:
obtaining a device profile for a device of building equipment, the device profile including a plurality of attributes characterizing the device of building equipment including at least a first device characteristic;
selecting, from a plurality of rating engines, a first rating engine for use in generating the rating based on the plurality of attributes characterizing the device of building equipment;
communicating the first device characteristic to the first rating engine;
receiving a first rating for the device of building equipment from the first rating engine; and
using the first rating to control the device of building equipment.

2. The system of claim 1, the operations further comprising:
obtaining the device profile for the device of building equipment, the device profile including a second device characteristic;
selecting, from the plurality of rating engines, a second rating engine for use in generating a second rating based on the plurality of attributes characterizing the device of building equipment;
communicating the second device characteristic to the second rating engine;
receiving the second rating for the device of building equipment from the second rating engine; and
using the second rating to control the device of building equipment.

3. The system of claim 2, wherein communicating the first device characteristic to the first rating engine and the second device characteristic to the second rating engine occurs asynchronously, and wherein the first rating engine and the second rating engine are different rating engines.

4. The system of claim 2, wherein communicating the first device characteristic to the first rating engine and the second device characteristic to the second rating engine occurs in series, and wherein the first rating engine and the second rating engine are the same rating engine.

5. The system of claim 1, the operations further comprising communicating the first rating to a device ratings database, wherein the device ratings database is configured to store a plurality of ratings.

6. The system of claim 1, the operations further comprising communicating the plurality of attributes characterizing the device of building equipment and the first device characteristic to a database, wherein the database is configured to store the plurality of attributes characterizing the device of building equipment and a plurality of device characteristics.

7. The system of claim 1, wherein the device profile includes a third device characteristic, and wherein the operations further comprise:

determining the third device characteristic is stored in a database; and
receiving, from the database, a third device rating based on the third device characteristic.

8. The system of claim 1, wherein the plurality of attributes characterizing the device of building equipment comprises at least one of a device family type, a device location, or a device configuration.

9. The system of claim 1, wherein the first rating comprises at least one of a device power consumption, a device performance metric, or a device flow metric.

10. The system of claim 1, the operations further comprising providing the first rating to a user via a user interface.

11. A method for modeling and controlling building equipment, the method comprising:
obtaining a device profile for a device of building equipment, the device profile including a plurality of attributes characterizing the device of building equipment including at least a first device characteristic;
selecting, from a plurality of rating engines, a first rating engine for use in generating the rating based on the plurality of attributes characterizing the device of building equipment;
communicating the first device characteristic to the first rating engine;
receiving a first rating for the device of building equipment from the first rating engine; and
using the first rating to control the device of building equipment.

12. The method of claim 11, the method further comprising:
obtaining the device profile for the device of building equipment, the device profile including a second device characteristic;
selecting, from the plurality of rating engines, a second rating engine for use in generating a second rating based on the plurality of attributes characterizing the device of building equipment;
communicating the second device characteristic to the second rating engine;
receiving the second rating for the device of building equipment from the second rating engine; and
using the second rating to control the device of building equipment.

13. The method of claim 12, further comprising communicating the first device characteristic to the first rating engine and the second device characteristic to the second rating engine asynchronously, wherein the first rating engine and the second rating engine are different rating engines.

14. The method of claim 12, further comprising communicating the first device characteristic to the first rating engine and the second device characteristic to the second rating engine occurs in series, wherein the first rating engine and the second rating engine are the same rating engine.

15. The method of claim 11, further comprising communicating the first rating to a device ratings database, wherein the device ratings database is configured to store a plurality of ratings.

16. The method of claim 11, further comprising communicating the plurality of attributes characterizing the device of building equipment and the first device characteristic to a database, wherein the database is configured to store the plurality of attributes characterizing the device of building equipment and a plurality of device characteristics.

17. The method of claim 11, further comprising:
determining a third device characteristic is stored in a database; and
receiving, from the database, a third device rating based on the third device characteristic, wherein the device profile includes the third device characteristic.

18. The method of claim 11, further comprising providing the first rating to a user via a user interface.

19. A non-transitory computer readable medium comprising instructions stored thereon that, when executed by one or more processors, cause the one or more processors to:
obtain a device profile for a device of building equipment, the device profile including a plurality of attributes characterizing the device of building equipment including at least a first device characteristic;
select, from a plurality of rating engines, a first rating engine for use in generating the rating based on the plurality of attributes characterizing the device of building equipment;
communicate the first device characteristic to the first rating engine;
receive a first rating for the device of building equipment from the first rating engine; and
use the first rating to control the device of building equipment.

20. The non-transitory computer readable medium of claim 19, the instructions further causing the one or more processors to:
obtain the device profile for the device of building equipment, the device profile including a second device characteristic;
select, from the plurality of rating engines, a second rating engine for use in generating a second rating based on the plurality of attributes characterizing the device of building equipment;
communicate the second device characteristic to the second rating engine;
receive the second rating for the device of building equipment from the second rating engine; and
use the second rating to control the device of building equipment.

* * * * *